(12) United States Patent
Mills et al.

(10) Patent No.: US 8,247,724 B2
(45) Date of Patent: Aug. 21, 2012

(54) CHUTES FOR SORTING AND INSPECTION APPARATUS

(75) Inventors: Stewart Mills, Upminster (GB); David Cox, Romford (GB)

(73) Assignee: Buhler Sortex Ltd., London (GB)

( * ) Notice: Subject to any disclaimer, the term of this patent is extended or adjusted under 35 U.S.C. 154(b) by 67 days.

(21) Appl. No.: 12/254,713

(22) Filed: Oct. 20, 2008

(65) Prior Publication Data
US 2010/0096300 A1    Apr. 22, 2010

(51) Int. Cl.
*B07C 5/00* (2006.01)
(52) U.S. Cl. ............... 209/576; 209/644; 193/6; 193/30
(58) Field of Classification Search ............... 193/6, 30; 209/576, 580, 644
See application file for complete search history.

(56) References Cited

U.S. PATENT DOCUMENTS

| | | | | |
|---|---|---|---|---|
| 176,700 A | * | 4/1876 | Sible | 298/5 |
| 606,520 A | * | 6/1898 | Darrah | 298/7 |
| 708,081 A | * | 9/1902 | Sackett | 193/6 |
| 708,082 A | * | 9/1902 | Sackett | 193/6 |
| 789,381 A | * | 5/1905 | Post | 193/6 |
| 827,349 A | * | 7/1906 | Converse | 193/6 |
| 1,241,436 A | * | 9/1917 | Peterson | 193/6 |
| 2,095,494 A | * | 10/1937 | Dobbs | 193/6 |
| 2,652,288 A | * | 9/1953 | Sands | 406/162 |
| 3,216,567 A | | 11/1965 | Kelly et al. | |
| 3,581,888 A | | 6/1971 | Kelly et al. | |
| 3,750,945 A | * | 8/1973 | Warr | 238/10 E |
| 3,976,176 A | | 8/1976 | Klutz et al. | |
| 3,990,580 A | | 11/1976 | Self et al. | |
| 4,009,912 A | | 3/1977 | Mraz et al. | |
| 4,466,544 A | | 8/1984 | Satake et al. | |
| 4,513,868 A | | 4/1985 | Culling et al. | |
| 4,577,725 A | * | 3/1986 | Hunter | 182/48 |
| 4,600,105 A | | 7/1986 | Van Zyl et al. | |
| 4,628,411 A | | 12/1986 | Balderes et al. | |
| 4,630,736 A | | 12/1986 | Maughan et al. | |
| 4,699,273 A | | 10/1987 | Suggi-Liverani et al. | |
| 4,715,487 A | | 12/1987 | Saika | |
| 5,016,686 A | * | 5/1991 | Gerstenkorn | 141/96 |
| 5,628,411 A | | 5/1997 | Mills et al. | |
| 5,678,477 A | | 10/1997 | Satake et al. | |
| 5,791,493 A | | 8/1998 | Meyer | |
| 6,059,117 A | | 5/2000 | Novak et al. | |

(Continued)

FOREIGN PATENT DOCUMENTS

DE    198 47 939 A1    4/2000

(Continued)

OTHER PUBLICATIONS

British Patent Office, Search Report in priority Great Britain Application No. GB0416717.7, Dec. 24, 2004, 1 page.

(Continued)

*Primary Examiner* — Joseph A Dillon, Jr.
(74) *Attorney, Agent, or Firm* — Davis Wright Tremaine LLP

(57) ABSTRACT

A chute for inspection and sorting apparatus has first and second flat sections, with the lower end of the first section being disposed over the second section to form a step from which product falls onto the second section. Additional sections may be included. In one variant a third channeled section is included, with the lower end of the second section being disposed over the third section forming a second step from which product falls onto the third section.

25 Claims, 3 Drawing Sheets

U.S. PATENT DOCUMENTS

| | | | |
|---|---|---|---|
| 6,186,304 B1 * | 2/2001 | H.ang.kansson | 193/6 |
| 6,629,611 B2 * | 10/2003 | Satake et al. | 209/657 |
| 6,682,294 B2 * | 1/2004 | Carroll | 414/537 |
| 7,851,722 B2 * | 12/2010 | Ito et al. | 209/588 |
| 2002/0008056 A1 | 1/2002 | Satake et al. | |
| 2007/0256959 A1 | 11/2007 | Deefholts | |
| 2007/0262002 A1 | 11/2007 | Ito et al. | |
| 2007/0262003 A1 | 11/2007 | Kussel et al. | |

FOREIGN PATENT DOCUMENTS

| | | |
|---|---|---|
| EP | 0 065 363 A1 | 11/1982 |
| EP | 0 146 299 A1 | 6/1985 |
| EP | 0 526 711 A1 | 2/1993 |
| GB | 951337 | 3/1964 |
| GB | 2416533 A | 2/2006 |
| JP | 60-26877 | 8/1985 |
| JP | 60-242324 A | 12/1985 |
| JP | 63-100993 | 5/1988 |
| JP | 02-2510 | 1/1990 |
| JP | 03-89981 | 4/1991 |
| JP | 2003-080173 A | 9/2001 |
| JP | 2001-524028 | 11/2001 |
| WO | WO 84/04707 A1 | 12/1984 |
| WO | WO2004/069430 A1 | 8/2004 |
| WO | WO 2006/010873 A | 2/2006 |

OTHER PUBLICATIONS

H. K. Hazel, "Cone Feed Technique", IBM Technical Disclosure Bulletin, vol. 2, No. 1, published Jun. 1, 1959, p. 7.

EPO/ISA, "International Search Report," corresponding Patent Application No. PCT/GB2005/000424, mailed on Apr. 12, 2005, 2 pages.

EPO/ISA, "International Preliminary Report on Patentability," corresponding Patent Application No. PCT/GB2005/000424, mailed on Nov. 3, 2006, 5 pages.

UK Intellectual Property Office, "Examination Report," corresponding Patent Application No. GB0416717.7, mailed on Jul. 25, 2007, 2 pages.

UK Intellectual Property Office, "Examination Report," corresponding Patent Application No. GB0416717.7, mailed on Dec. 20, 2007, 2 pages.

China State Intellectual Property Office, "Office Action," corresponding Chinese Patent Application No. 200510084558.3, mailed on Jul. 11, 2008, 10 pages (including translation.).

EPO, "Office Action," corresponding European Patent Application No. 05 702 142.0, mailed on Aug. 19, 2008, 1 page.

USPTO, "Office Action," mailed in related U.S. Appl. No. 11/572,895 on Sep. 8, 2008, 17 pages.

USPTO, "Office Action," mailed in related U.S. Appl. No. 11/572,895 on Feb. 10, 2009, 16 pages.

USPTO, "Office Action," mailed in related U.S. Appl. No. 11/572,895 on Sep. 2, 2009, 15 pages.

USPTO, "Office Action," mailed in related U.S. Appl. No. 11/572,895 on May 11, 2010, 11 pages.

USPTO, "Office Action," mailed in related U.S. Appl. No. 11/572,895 on Nov. 16, 2010, 18 pages.

* cited by examiner

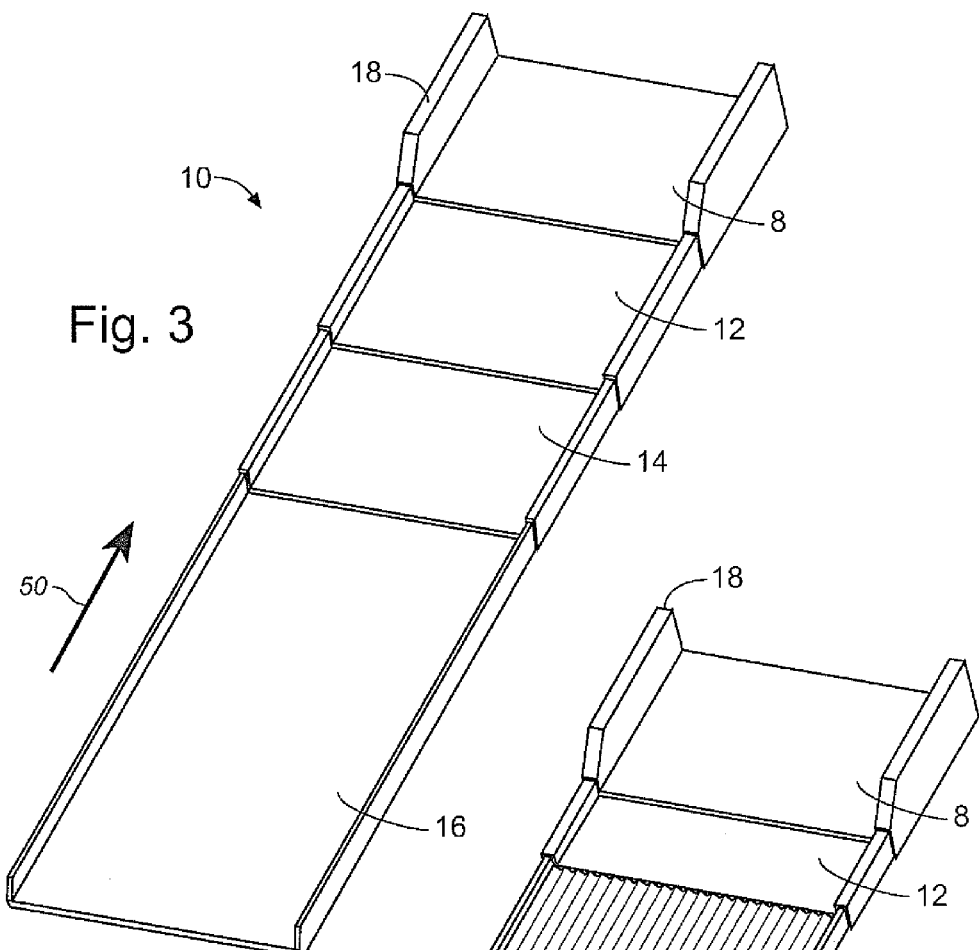

CHUTES FOR SORTING AND INSPECTION APPARATUS

BACKGROUND OF THE INVENTION

This invention relates to chutes for use in inspection and sorting apparatus, particularly to such apparatus in which products are fed to a chute which delivers it to a sorting or inspection station. Sorting apparatus of this type is described in U.S. Pat. Nos. 4,513,868; 4,630,736; and 5,628,411, the disclosures whereof are hereby incorporated by reference. Inspection apparatus can use similar techniques but for the purpose of gathering data, rather than ejecting unacceptable pieces from the product stream.

For some products, grooved or channelled chutes are used to orient and position the product pieces when they leave the lower end of the chute. This facilitates the sorting or inspection process, and in sorting apparatus can help to ensure that devices and mechanisms used to eject pieces from the product stream operate only on the properly selected pieces.

In the sorting or inspection station in apparatus of the kind to which the invention relates, product is normally delivered from a supply hopper onto a vibratory feeder which discharges it to form a stream on a chute for delivery to a sorting or inspection station. At that station the apparatus will typically use an optical system to differentiate between product pieces of different quality, and ideally each product piece in the product stream is separate from all adjacent pieces so that individuals can be readily identified and as appropriate, ejected. At the same time it is of course desirable to have as many pieces as possible in the product stream. As the product flows off the vibrator it is moving relatively slowly. In some known apparatus, where the product feeds straight off a feeder tray onto a channelled chute, the product is fed straight into the channels. If two or more grains enter a channel at the same time they will travel side by side in the channel, a little slower than individual grains, that will catch up with them and then form bunches. Once in the channel there is a tendency for these bunches of product to travel at the same velocity and not separate out on the chute, thus passing the inspection station as bunches rather than individual spaced product pieces. This reduces the efficiency of the inspection and in sorting apparatus can cause more than one grain to be ejected if a defect is detected. To avoid this it is necessary to limit the rate of flow of product into the chute and the capacity of the apparatus is reduced. This problem is addressed in International Patent Publication No: WO 2006/010 873, the disclosure whereof is hereby incorporated by reference. That publication discloses a chute having a first smooth section and a second grooved section receiving product from the first section and from which the product is eventually discharged.

SUMMARY OF THE INVENTION

We have found that the flow pattern of product down a chute in sorting or inspection apparatus of the kind referred to above can be improved by using a chute having stepped smooth sections. While the use of grooves or channels to align product pieces can be beneficial, they are not essential to achieve satisfactory separation. In other words, successive smooth sections in which the end of the earlier section forms a step from which product falls onto the later section, itself serves to separate product pieces from each other, facilitating differentiation between product pieces at the sorting or inspection station. It is believed that as product pieces tumble from one section to the next, bunched or attached product pieces are separated.

According to the invention, a chute for use in sorting or inspection apparatus has an upper and a lower end, with a first section at the upper end, and a second section for receiving product from the lower end of the first section. Both sections have a substantially even surface. Product is delivered, for example from a hopper over a vibrator, to the upper end of the first chute section, and discharged from the lower end of the second section. The lower end of the first section is disposed over the second section to form a step from which product falls onto the second section. The size or depth of the step will be set relative to the dimensions of the product being sorted or inspected. For example, for rice it will typically be equal to or greater than the mean length of the rice grains. In this respect, it will be appreciated that the depth of the step will normally be measured perpendicular to the surface of the later chute section, although the vertical length of the step will of course be dependent upon the inclination of the respective chute section surface. Typically this is 20° to 40° from the vertical.

In chutes according to the invention the surfaces of the first and second sections are substantially even, and normally flat and polished. The sections themselves can be formed as an aluminum alloy extrusion. However, the surfaces may themselves differ, such that the first chute section offers greater resistance to flow of product thereon than does the second. The chute section surfaces may have particular coatings to provide the desired resistance, and this also can be dependent upon the nature of the product to be sorted or inspected. A useful surface coating, particularly for the second or lower chute section, is polytetrafluoroethylene. Alternatively, the chute surface can be treated to create particular surfaces. One such treatment is anodizing.

The chute of the invention has been described above as comprising first and second sections. However, three or more sections can be used if required, to progressively separate and organise product pieces before delivery to the sorting or inspection station. If a third or subsequent chute section is used, it may be formed with channels extending to its lower end so that the product pieces are not only separated, but also substantially aligned upon delivery to the sorting or inspection station.

The length of each chute section relative to the total length of a multi-section chute of the invention can also be selected with reference to the product being sorted or inspected. With two sections, the length of the first will normally be 20 to 50% of the overall chute length. If three or more chute sections are used, the third or last section, which may be formed with channels or alternatively, shallow grooves. This section will normally be the longest section, and can be equal to or longer than the combined lengths of the earlier sections. This serves to stabilise the flow of product prior to discharge. In a typical chute having three sections, the length of the first section will normally be greater than that of the second section, but less than that of the third.

Each section in a chute according to the invention will normally be flat such that the sections define successive linear paths. However, one or more sections can have a curved profile. Particularly, some benefit can be had if the first section, which receives product from a feed station, defines a convex flow path. The last section can be convex or concave to accelerate or slow the acceleration of product just prior to discharge to the sorting or inspection station.

Sorting apparatus using a chute according to the invention will as noted above, normally have an optical system at the sorting station. Suitable optical sorting systems are described in the Patents referred to above. At the upper end of the chute a feed station normally comprises a horizontal conveyor 4 carrying product from a hopper or other reservoir to be fed to the chute. Typically, the conveyor is a vibratory feeder providing uniform delivery of the product pieces to the chute.

As noted above, the invention is equally useful in inspection apparatus in which product in the stream leaving a chute is inspected for the purposes of data retrieval rather than sorting. Similar inspection mechanisms can be employed as are used in sorting apparatus of the kind just referred to. Such inspection is useful to gather attributes about the product flowing through the machine such as broken or distorted product pieces.

Chutes of the invention are particularly suited to sorting or inspecting product with a relatively high concentration of defective product. One application of the invention is in "re-sorting" processes which involve two or more stages. In the first stage, only very high quality product is accepted by allowing quite a lot of good to be rejected with the poor quality product. The reject from this first pass, which has a higher concentration of defective product, is then sorted again in a second pass to recover most of the good product. Chutes of the invention may be used in primary, secondary and subsequent sorting stages.

Chutes of the present invention are useful in apparatus for sorting and inspecting a wide range of products including for example, coffee beans and rice. Product having a generally elongate shape will of course tend to align themselves naturally in channels or grooves, but the channels and grooves are also effective for controlling the movement of product having widely different shapes.

BRIEF DESCRIPTION OF THE DRAWINGS

The invention will now be described by way of example and with reference to the accompanying schematic drawing wherein:

FIG. 3 is a front perspective view of a chute according to a third embodiment of the invention; and FIG. 4 is a front perspective view of a chute according to a fourth embodiment of the invention.

DESCRIPTION OF PREFERRED EMBODIMENTS

Figure 1:
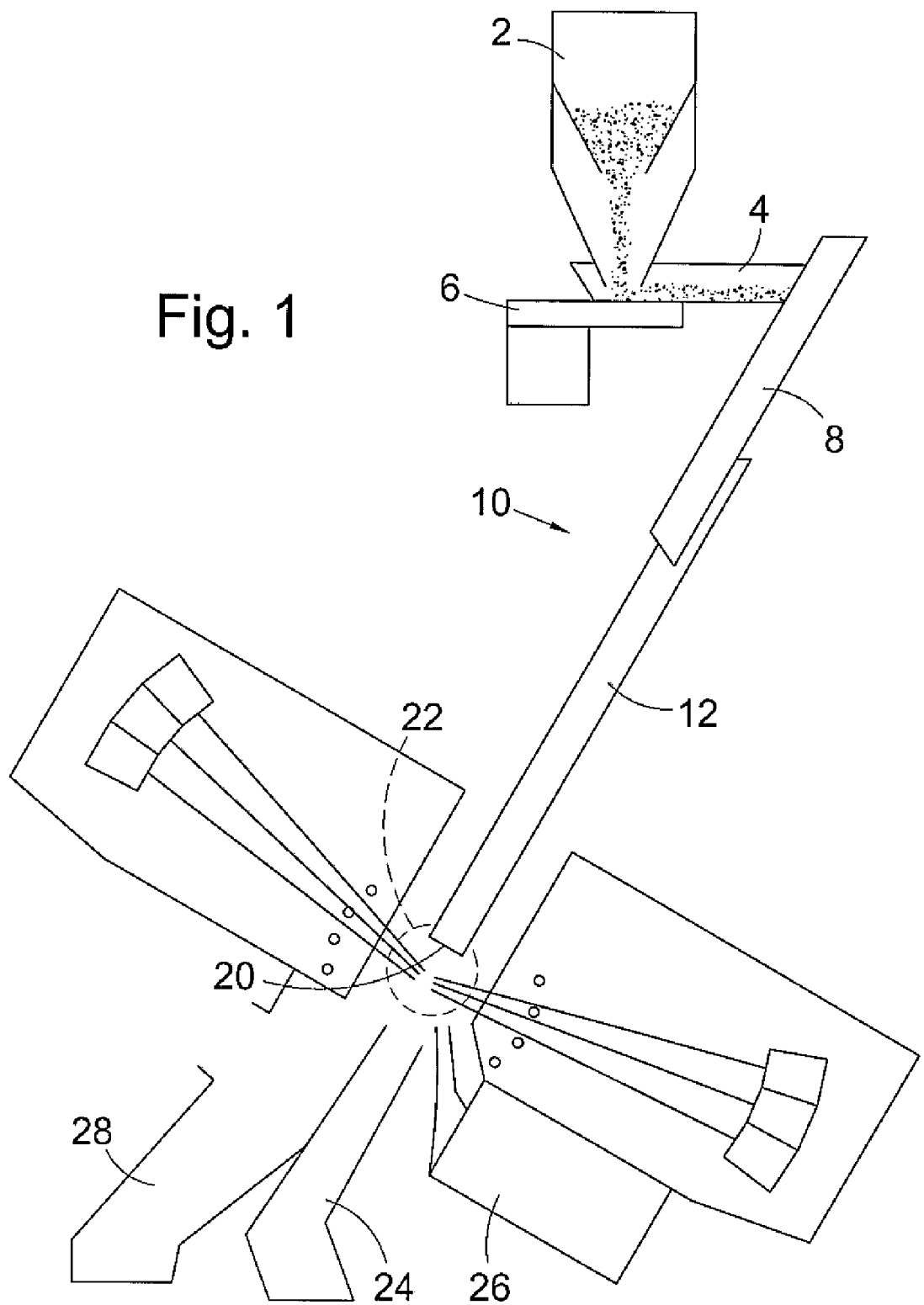
FIG. 1 illustrates sorting or inspection apparatus using a chute according to the first embodiment of the invention.

FIG. 1 illustrates sorting apparatus of the kind disclosed in International Patent Publication No: WO 2006/010 873, referred to above. It comprises an input hopper 2 which delivers product to be sorted or inspected to a tray 4 mounted on a vibratory feeder 6. Operation of the feeder delivers product to the upper end of the first section 8 of a chute 10. This first section 8 has a highly polished smooth surface, typically of aluminum. Product released onto this first section 8 moves freely laterally and downwardly on the surface and is delivered to the second section 12. The second section 12 also has a highly polished smooth surface along which the product continues to flow. A typical highly polished surface has a roughness average measured in the lateral direction of 0.2 microns. As an alternative to highly polished surfaces, one or both of the first and second sections can be treated or coated to create particular surface characteristics. A typical surface treatment is anodizing. A typical surface coating is polytetrafluoroethylene.

The product pieces fall from the discharge end 20 of the chute into the inspection zone 22. In the inspection zone 22 the product pieces are illuminated and monitored using optical techniques of the kind disclosed in the patents referred to above. If the apparatus is used for inspection only, then the product pieces continue unimpeded into the receptacle 24. If the apparatus is for sorting, then an ejector 26 normally a pneumatic ejector, is included to eject pieces from the product stream in response to signals generated by the inspection devices. Ejected product pieces are deflected from the product stream into a reject receptacle 28.

Figure 2:
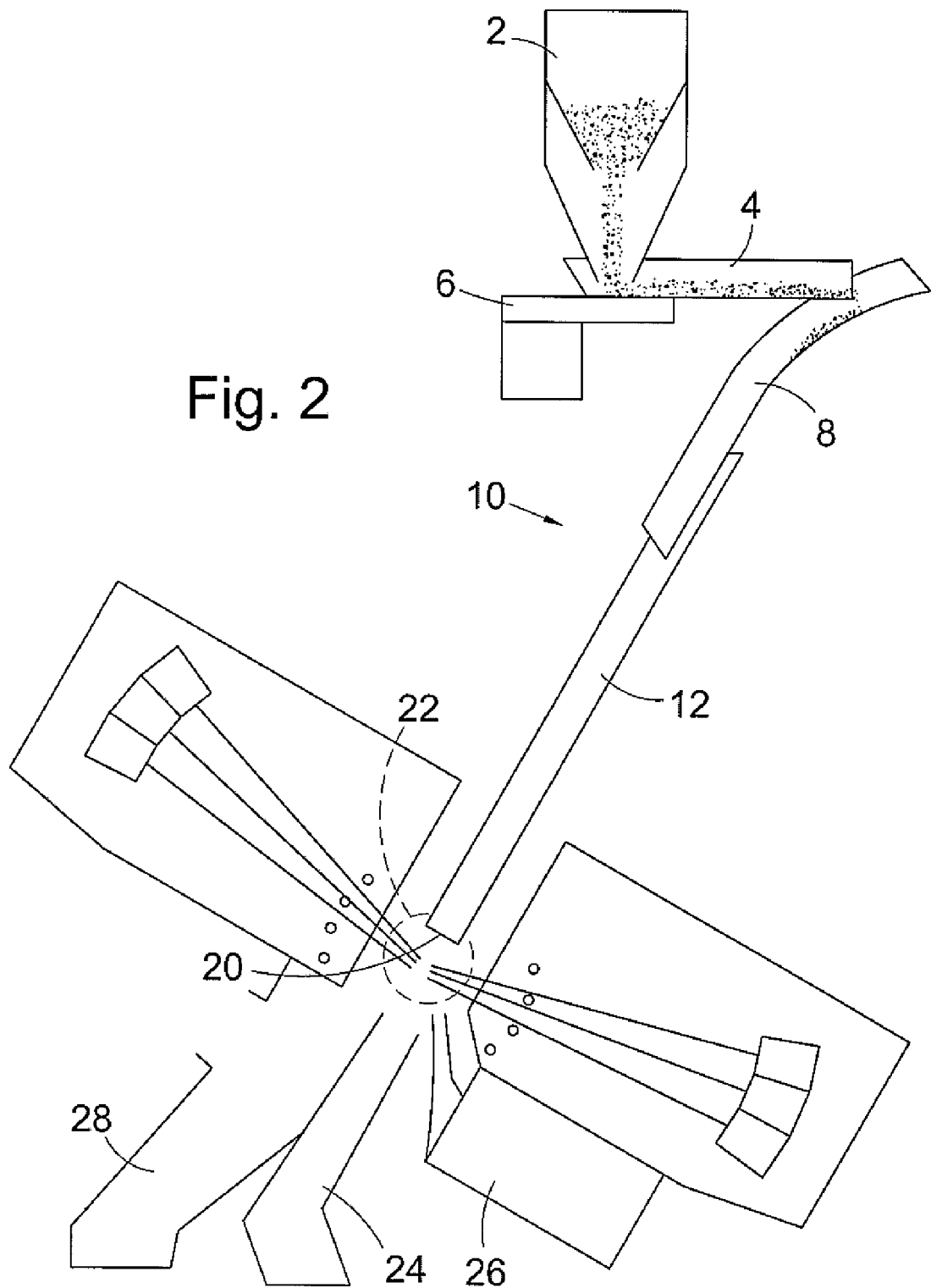
FIG. 2 illustrates sorting or inspection apparatus using a chute according to a second embodiment of the invention.

FIG. 2 illustrates apparatus essentially similar to that of FIG. 5, but in which the first section 8 of the chute has a curved profile. With this profile, product pieces delivered from the tray 4 accelerate on the section 8 towards the second section 12 a little more slowly, and this can be of assistance where the delivery rate from the tray is relatively slow, and there is a need or desire to slow the rate of delivery of product to the second section. This can improve the lateral separation of product pieces.

A typical chute according to the invention will have a width of around 300 mm, and a length of around 1200 mm. The length of the first section will normally be at least 20%, and preferably no more than 50% of the overall chute length. In the embodiment of FIG. 1 it is around 500 mm long; around 40%. The depth of the step, perpendicular to the plane of the chute surface will normally be at least 0.5 mm and typically 2 to 3 mm, but a particular depth will be selected to suit the product on the chute.

The transition from the first section 8 to the second section 12 is a step whose depth is determined relative to the nature of the product being sorted or inspected. As product falls over the step and tumbles onto the second section 12, bunched or attached product pieces become separated. For many products a single step of this kind will result in the product pieces being sufficiently separated to enable them to be effectively differentiated at the sorting or inspection station, and they can therefore be released directly from the second section to the sorting or inspection station. However, if a single "step" does not achieve sufficient separation, then one or more additional steps can be created by the inclusion of one or more additional chute sections. A chute having four sections is shown in FIG. 3. As can be seen, the first, second and third sections 8, 12 and 14 are of substantially equal length. The fourth section 16 has a length substantially equal to the accumulated length of the earlier sections. The chute of FIG. 4 has three sections, of which the third has elongate channels in which product released from the second section is aligned before discharge to the sorting or inspection station. As can be seen, in FIG. 4 the channelled section 16 is considerably longer than either of the first and second sections, and that the first section is longer than the second. The first section is bounded by wings 18 to reduce product spillage on delivery.

The channels of the third section 16 can have a standard U-shaped or V-shaped cross-section, and described in WO 2006/010 873, referred to above and incorporated by reference. Depending upon the product for which the chute is to be used, each channel may have a cross-sectional area in the range 2 mm to 25 mm. A typical depth of each groove is no more than 3 mm. In a particular variant, the channels can take the form of shallow grooves, each having a depth of around 0.5 mm. In cross-section, such a surface appears as corrugated, or a shallow sinusoidal curve, with the pitch of each groove being in the range 2 to 2.5 mm.

As product moves along each section of a chute according to the invention, it is accelerating under gravity. This movement is disrupted at each transition, and the final section is made longer to provide for a longer period of continuous acceleration before discharge to the sorting or inspection station. The rate at which product moves down the chute sections can be controlled by the respective surfaces. These can be created by particular coatings selected having regard to the product under consideration. Highly polished surfaces provide minimal resistance to dry product. Some plastics coatings, such as polytetrafluoroethylene, are effective with product having some moisture content. If successive chute sections are to offer different resistance to passage of product, then the resistance offered by a chute section should normally be less than that of the section from which it is receiving product. In some embodiments the chute sections can be moved relative to one another to alter their respective lengths along arrows 50 as shown in FIGS. 3 and 4. This can be readily accomplished by having the one or each upper section supported in the respective adjacent lower section.

The sections in chutes according to the invention will normally be manufactured separately, and mechanically secured to form a single assembly for installation in sorting or inspection apparatus of the kind described. The sections themselves may be extrusions in an aluminum alloy, and the surfaces adapted for the particular purpose of the apparatus in which the chute is to be installed. The feed surface in each section can be polished or coated to provide the appropriate feed properties and protection against corrosion. The surface in each chute section can as noted above, also be selected to provide the requisite encouragement or resistance to motion of product therealong.

The invention claimed is:

1. Inspection apparatus comprising:
    a feed station comprising:
        a product reservoir;
        an essentially horizontal conveyor;
        a chute assembly comprising a plurality of chute sections, which are mechanically secured to form the chute assembly, said plurality of chute sections comprising at least a first chute section and a second chute section;
        an optical system, for inspecting a characteristic of a product piece, which optical system is positioned to inspect at an inspection zone and comprises illumination means;
    wherein the chute assembly is positioned below the feed station and above the inspection zone and the first chute section is positioned at an upper end of the chute assembly; and wherein the inspection apparatus is configured such that, in use:
    a flowable product which:
        is to be inspected by the inspection apparatus; and
        is initially contained in the product reservoir; and
        consists of a plurality of product pieces;
        is fed by the essentially horizontal conveyor to the first chute section of the chute assembly; and
        the flowable product subsequently flows as a product stream along each chute section successively by gravitational acceleration to a discharge end of the chute assembly; and
        the product stream subsequently falls from the discharge end of the chute assembly into the inspection zone;
    and further comprising:
        means for enhancing downward flow comprising the at least first and second chute sections being substantially smooth sections, not formed with alignment channels or grooves, but rather having substantially even surfaces configured such that the product moves freely both downwardly and laterally on the surfaces of the first and second chute sections; and
        means for facilitating differentiation between product pieces comprising the first chute section and the second chute section being mechanically secured within the chute assembly such that a step of a predetermined depth exists between the first chute section and the second chute section, and such that, in use, the product stream falls from the first chute section onto the second chute section, whereby individual product pieces tend to be separated from each other.

2. An inspection apparatus according to claim 1 in which all of the chute sections of the chute assembly are smooth sections.

3. An inspection apparatus according to claim 1 wherein both the first chute section and the second chute section are flat.

4. An inspection apparatus according to claim 1 wherein the length of a chute section which is positioned at the discharge end of the chute assembly is greater than the length of any other chute section.

5. An inspection apparatus according to claim 1 wherein the predetermined depth of the step is between 0.5 mm and 3 mm.

6. An inspection apparatus according to claim 5 wherein the predetermined depth of the step is between 2 mm and 3 mm.

7. An inspection apparatus according to claim 1 wherein the length of the chute assembly is around 1200 mm.

8. An inspection apparatus according to claim 1 further comprising a third chute section, a surface of which is formed with alignment channels or shallow grooves extending to the discharge end of the chute assembly.

9. An inspection apparatus according to claim 1 wherein the essentially horizontal conveyor is a vibratory feeder comprising a tray mounted on a vibrator.

10. An inspection apparatus according to claim 1 wherein the plurality of chute sections are separately manufactured prior to being mechanically secured to form the chute assembly.

11. An inspection apparatus according to claim 1 wherein the product which the inspection apparatus is configured to inspect is a food product.

12. An inspection apparatus according to claim 11 wherein the food product is selected from the group of food products consisting of grains and rice and coffee beans.

13. An inspection apparatus according to claim 1 wherein the surface of the first chute section provides greater resistance to the flow of the product stream thereon than does the surface of the second chute section.

14. An inspection apparatus according to claim 1 wherein at least one of the chute section surfaces is coated.

15. An inspection apparatus according to claim 12 wherein the surface coating comprises polytetrafluoroethylene.

16. An inspection apparatus according to claim 1 wherein at least one of the chute sections has been subject to surface treatment.

17. An inspection apparatus according to claim 16 wherein said surface treatment comprises polishing.

18. An inspection apparatus according to claim 16 wherein said surface treatment comprises anodising.

19. An inspection apparatus according to claim 1 wherein the first chute section has a curved profile.

20. An inspection apparatus according to claim 1 wherein the chute assembly is configured such that the chute sections can be moved relative to one another to alter their respective lengths.

21. An inspection apparatus according to claim 2 wherein the first chute section is bounded by wings whereby product spillage is reduced.

22. A sorting apparatus comprising:
an inspection apparatus comprising:
a feed station comprising:
a product reservoir;
an essentially horizontal conveyor;
a chute assembly comprising a plurality of chute sections, which are mechanically secured to form the chute assembly, said plurality of chute sections comprising at least a first chute section and a second chute section;
an optical system, for inspecting a characteristic of a product piece, which optical system is positioned to inspect at an inspection zone and comprises illumination means;
wherein the chute assembly is positioned below the feed station and above the inspection zone and the first chute section is positioned at an upper end of the chute assembly;
and wherein the inspection apparatus is configured such that, in use:
a flowable product which:
is to be inspected by the inspection apparatus; and
is initially contained in the product reservoir; and
consists of a plurality of product pieces;
is fed by the essentially horizontal conveyor to the first chute section of the chute assembly; and
the flowable product subsequently flows as a product stream along each chute section successively by gravitational acceleration to a discharge end of the chute assembly; and
the product stream subsequently falls from the discharge end of the chute assembly into the inspection zone;
and further comprising:
means for enhancing downward flow comprising the at least first and second chute sections being substantially smooth sections, not formed with alignment channels or grooves, but rather having substantially even surfaces configured such that the product moves freely both downwardly and laterally on the surfaces of the first and second chute sections; and
means for facilitating differentiation between product pieces comprising the first chute section and the second chute section being mechanically secured within the chute assembly such that a step of a predetermined depth exists between the first chute section and the second chute section, and such that, in use, the product stream falls from the first chute section onto the second chute section;
and said sorting apparatus further comprising:
an ejector which is configured to eject product pieces from the product stream in response to signals generated by the inspection apparatus.

23. An inspection method employing an apparatus comprising:
a feed station comprising:
a product reservoir;
an essentially horizontal conveyor;
a chute assembly comprising a plurality of chute sections, which are mechanically secured to form the chute assembly, said chute assembly comprising at least a first chute section and a second chute section; and
an optical system positioned to inspect at an inspection zone and comprising illumination means;
wherein the chute assembly is positioned below the feed station and above the inspection zone and the first chute section is positioned at an upper end of the chute assembly;
said method comprising:
feeding a flowable product from the feed station to the first chute section of the chute assembly, such that:
the product subsequently flows as a product stream along each chute section successively by gravitational acceleration to a discharge end of the chute assembly;
the product stream subsequently falls from the discharge end of the chute assembly into the inspection zone; and
enhancing downward flow while separating individual product pieces from each other by means of:
providing at least first and second chute sections as substantially smooth sections without alignment channels or grooves, but rather have substantially even surfaces, whereby the product moves freely both downwardly and laterally on the surfaces of the first and second chute sections; and
mechanically securing the first and the second chute sections within the chute assembly such that a step of a predetermined depth exists between the first chute section and the second chute section, whereby the product stream falls from the first chute section onto the second chute section.

24. A method of enabling an improvement of a flow pattern of a product stream down a chute in an inspection apparatus in which product pieces are fed to the chute which delivers the product stream to an inspection zone, said inspection apparatus comprising:
a feed station comprising:
a product reservoir;
an essentially horizontal conveyor;
an optical system, for inspecting a characteristic of a product piece, which optical system is positioned to inspect at the inspection zone and comprises illumination means;
the chute, which is positioned below the feed station and above the inspection zone;
wherein said inspection apparatus is configured such that, in use:
a flowable product which:
is to be inspected by the inspection apparatus; and
is initially contained in the product reservoir; and
consists of a plurality of said product pieces;
is fed by the essentially horizontal conveyor to the chute; and
the flowable product subsequently flows as the product stream along the chute by gravitational acceleration to a discharge end of the chute; and
the product stream subsequently falls from the discharge end of the chute into the inspection zone;
said method of enabling flow pattern improvement comprising the step of:
providing a chute assembly as a replacement for the chute, wherein said chute assembly comprises:
a plurality of chute sections, which are mechanically secured to form the chute assembly, said plurality of chute sections comprising at least a first chute section and a second chute section, wherein the first chute section is positioned at an upper end of the chute assembly;
means for enhancing downward flow comprising the at least first and second chute sections being substantially smooth sections, not formed with alignment channels or grooves, but rather having substantially even surfaces configured such that, in use, the product moves freely both downwardly and laterally on the surfaces of the first and second chute sections; and means for facilitating differentiation between product pieces comprising the first chute section and the second chute section being mechanically secured within the chute assembly such that a step of a predetermined depth exists between the first chute section and the second chute section, and such that, in use, the product stream falls from the first chute section onto the second chute section, whereby individual product pieces tend to be separated from each other.

25. A method of forming an inspection apparatus, said apparatus comprising:

a feed station comprising:

a product reservoir;

an essentially horizontal conveyor;

an optical system, for inspecting a characteristic of a product piece, which optical system is positioned to inspect at an inspection zone and comprises illumination means;

said method comprising:

providing a chute assembly suitable for placement below the feed station and above the inspection zone, said chute assembly comprising a plurality of chute sections, which are mechanically secured to form the chute assembly, said plurality of chute sections comprising at least a first chute section and a second chute section, wherein the first chute section is positioned at an upper end of the chute assembly; and wherein the inspection apparatus is configurable such that, in use:

a flowable product consisting of a plurality of product pieces to be inspected by the inspection apparatus, and initially contained in the product reservoir, is fed by the essentially horizontal conveyor to the first chute section of the chute assembly; and the flowable product subsequently flows as a product stream along each chute section successively by gravitational acceleration to a discharge end of the chute assembly; and the product stream subsequently falls from the discharge end of the chute assembly into the inspection zone; and downward flow while separating individual product pieces from each other is enhanced by means of:

wherein the at least first and second chute sections provided have substantially smooth sections without alignment channels or grooves, but rather having substantially even surfaces, whereby the product moves freely both downwardly and laterally on the surfaces of the first and second chute sections; and wherein the first and the second chute sections provided are mechanically secured within the chute assembly such that a step of a predetermined depth exists between the first chute section and the second chute section, whereby the product stream falls from the first chute section onto the second chute section.

\* \* \* \* \*